United States Patent [19]

Wakamatsu

[11] 4,350,378

[45] Sep. 21, 1982

[54] BUMPER FOR USE ON VEHICLES

[75] Inventor: Fumio Wakamatsu, Okazaki, Japan

[73] Assignee: Aisin Seiki Kabushiki Kaisha, Kariya, Japan

[21] Appl. No.: 180,434

[22] Filed: Aug. 22, 1980

[30] Foreign Application Priority Data

Aug. 29, 1979 [JP] Japan .................. 54/119671[U]

[51] Int. Cl.³ ............................................. B60R 19/08
[52] U.S. Cl. ..................................... 293/120; 293/109
[58] Field of Search ................ 293/117, 109, 120, 121

[56] References Cited

U.S. PATENT DOCUMENTS

| | | | |
|---|---|---|---|
| 3,493,257 | 2/1970 | Fitzgerald et al. | 293/120 |
| 3,583,756 | 6/1971 | Wilfert | 293/120 |
| 3,666,310 | 5/1972 | Burgess et al. | 293/120 |
| 3,869,165 | 3/1975 | Miller | 293/121 |
| 3,897,095 | 7/1975 | Glance et al. | 293/120 |
| 4,030,735 | 6/1977 | Jacob et al. | |
| 4,050,689 | 9/1977 | Barton et al. | 293/110 |
| 4,073,528 | 2/1978 | Klie | |
| 4,116,893 | 9/1978 | Flanagan | 293/109 |

*Primary Examiner*—Joseph F. Peters, Jr.
*Assistant Examiner*—Ross Weaver
*Attorney, Agent, or Firm*—Finnegan, Henderson, Farabow, Garrett & Dunner

[57] ABSTRACT

A bumper for vehicles includes a rim, a foamed plastic form positioned within the rim for absorbing shock, a reinforcement member for reinforcing the plastic form, and at least one extended portion defined by the reinforcement member and projecting into the plastic form to integrally join the foamed plastic form and the reinforcement member.

6 Claims, 3 Drawing Figures

BUMPER FOR USE ON VEHICLES

BACKGROUND OF THE INVENTION

1. Field of the Invention

The present invention relates to a bumper, and more particularly to a bumper for use on vehicles.

2. Description of the Prior Art

In a conventional bumper for vehicles, a foamed urethane form is inserted into a rim comprising a material such as plastic urethane, thereby absorbing the impact force upon collision of the vehicle. In order to attach the bumper to a front surface of a vehicle body, the urethane form is first inserted into the rim, and the rim and reinforcement member are joined together. The reinforcement member is located at the rear of the urethane form and functions to reinforce it. Since there is no positive fixation between the urethane form and the reinforcement member, the urethane form can change position in the bumper assembly creating a clearance between it and the reinforcement member. The rim, upon impact, could be forced into the clearance and thereby the essential function of the bumper in absorbing impact forces may be impaired.

CROSS REFERENCE TO CO-PENDING APPLICATION

In applicant's co-pending application, Ser. No. 06/148,725, filed May 12, 1980, entitled "Bumper For Vehicles" a bumper is disclosed which includes a rim member formed as a result of a molding operation, and a foamed urethane form positioned within said rim member to absorb shocks to which the bumper is subjected, and a reinforcement member to reinforce the bumper and positioned rearwardly of said form and fixed to said rim member when the latter is formed, the reinforcement member having a plurality of apertures through which molten material such as urethane is poured to form said rim member integrally fixed to the reinforcement member upon setting of the molten material.

The rim member has an extended portion and an inward and lower end portion whereat it is fixed to the reinforcement member. The reinforcement member comprises a flange portion to provide more rigid fixation to the rim member and, in one embodiment of the invention, also comprises a section which extends to the outside of the extended portion of the rim member, and, in another embodiment of the invention, comprises a restraining member inserted between the reinforcement member and the extended portion of said rim member.

SUMMARY OF THE INVENTION

An object of the present invention is to provide an improved bumper for vehicles which obviates the aforementioned drawbacks of the described conventional bumper.

A further object of the present invention is to provide an improved bumper for vehicles in which the foamed urethane form is fixed to the reinforcement member to prevent them from separating.

A still further important object of this invention is to provide an improved bumper for vehicles which prevents movement of the foamed urethane form in the bumper assembly.

Another object of this invention is to provide an improved bumper for vehicles which is relatively simple and includes a minimum number of parts.

Additional objects and advantages of this invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention as embodied and broadly described herein, this invention is directed to a bumper for vehicles which includes a rim member formed in a molding operation, a foamed urethane form positioned within said member to absorb the shocks to which the bumper is subjected, and a reinforcement member to reinforce the bumper and positioned rearwardly of said form and fixed to the rim member when the latter is formed, the reinforcement member having a plurality of apertures through which molten material such as urethane is poured to form the rim member integrally fixed to the reinforcement member upon setting of the molten material, and further having at least one extended portion which projects into said foamed urethane form whereby the form and the reinforcement member are integrally fixed to each other upon setting of the molten material.

In one embodiment of the invention, the extended portion comprises a flange-shaped portion, and in another embodiment it comprises a bended-shaped portion. In yet another embodiment of the invention, the extended portion comprises at least one of a spherical-shaped portion and a T-shaped portion.

BRIEF DESCRIPTION OF THE DRAWINGS

Various other features, objects and attendant advantages of the present invention will become self-evident when considered in connection with the accompanying drawings wherein.

DETAILED DESCRIPTION OF THE PREFERRED EMBODIMENT

Figure 1:
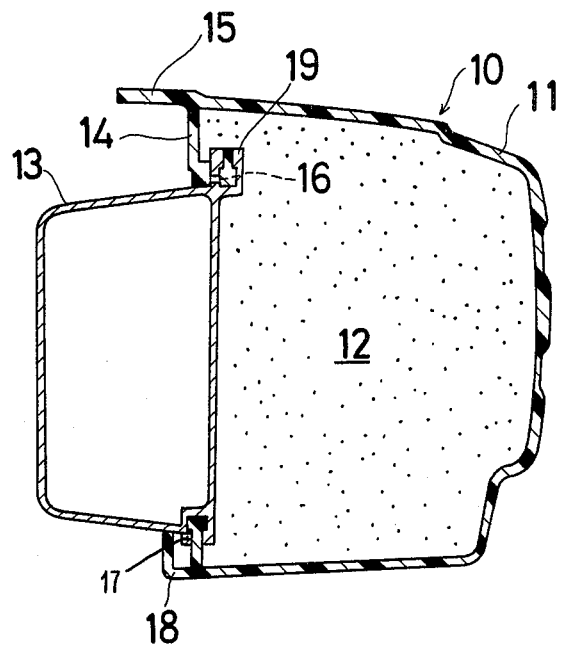
FIG. 1 is a sectional view which shows a preferred embodiment of a bumper for vehicles according to the invention.

Referring now to FIG. 1, the reference numeral 10 denotes the bumper assembly which comprises a rim 11 of material such as plastic urethane, a foamed urethane form 12 positioned within rim 11, and a reinforcement member 13 for reinforcing the foamed urethane form 12 and located to the rear thereof.

An extended integral portion 14 is formed at the inner upper end portion 15 of rim 11, and extends inwardly from the rim. A plurality of apertures 16 and 17 are respectively defined in the reinforcement member where it is fixed to extended portion 14 of rim 11 and where it is fixed to inner lower end portion 18 of the rim. The rim 11 and reinforcement member 13 are integrally fixed to prevent them from separating as explained hereafter. A flange portion 19 of reinforcement member 13 projects into the foamed urethane form 12, integrally fixing it to the reinforcement member.

In accordance with the invention, the bumper assembly 10 is assembled by inserting foamed urethane form 12 into a mold (not shown) and setting reinforcement member 13 at a predetermined position with respect thereto. A molten plastic material such as molten urethane is then poured throughout apertures 16 and 17 to fill the mold, thereby forming rim 13. During the molding procedure, the foamed urethane form 12 is completely encased by the molten urethane thereby hermetically sealing it and preventing water that may collect in the bumper from changing the characteristics of the foamed urethane. Apertures 16 and 17 provide conduits through which the molten material may be poured into the mold and also function to release air and gas generated during molding. Upon setting of the molten urethane contained in the mold and apertures 16 and 17, rim 11, and reinforcement member 13 are firmly affixed and cannot be separated easily.

The integral fixation of reinforcement member 13 and foamed urethane form 12 by the insertion and projection of flange portion 19 into the form prevents the latter from moving during molding and after setting of the molten material and assembly of the bumper eliminating possible clearances that might otherwise result between the form and rim and the resulting disadvantages as explained above with respect to conventional bumpers.

Figure 2:
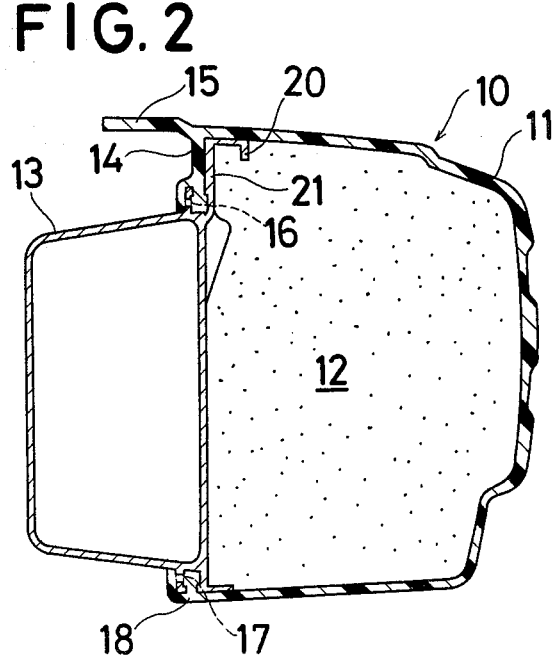
FIG. 2 is generally a similar view of FIG. 1 but shows a second embodiment of the invention.

FIG. 2 shows another embodiment of the invention wherein similarly numbered elements correspond to the elements identified above with respect to FIG. 1. The embodiment of FIG. 2 differs from that of FIG. 1 in that it does not include a flange portion 19 but does provide an extended portion 20 formed at the upper end portion 21 of reinforcement member 13 which projects into the foamed urethane form 12. Extended portion 20 is located along the inner part of portion 14 of rim 13 and includes a bended or hook-like section at its end which extends into form 12. The integral fixing of form 12 and reinforcement member 13 by portion 20 functions to prevent the two from separating and avoids creation of clearances caused by otherwise possible movement of the form within the bumper assembly as described above.

Figure 3:
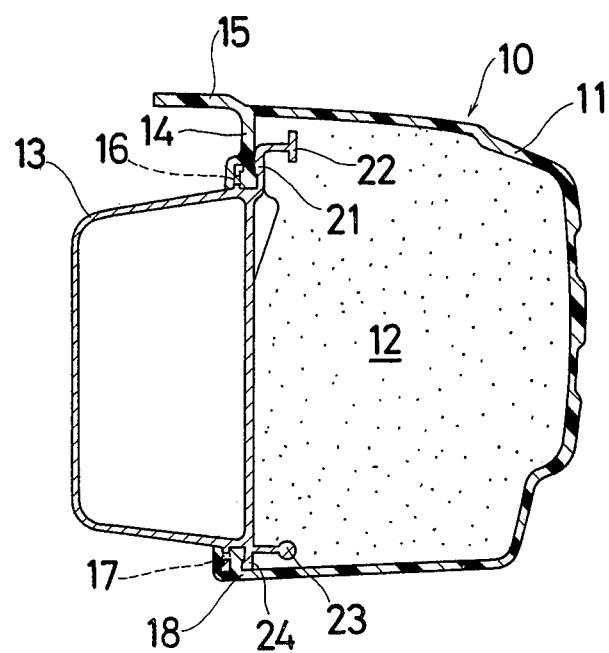
FIG. 3 is generally a similar view to FIG. 1 but shows a third embodiment of the invention.

FIG. 3 shows yet another embodiment of the invention in which similarly numbered elements correspond to the elements described with respect to FIG. 1. However, in FIG. 3, a T-shaped portion 22 is integrally defined by rim 13 at the upper end portion 21 thereof and projects inwardly into form 12. An extended spherical portion 23 is formed at the lower end portion 24 of reinforcement member 13 and also projects inwardly into form 12. The projecting portions 22 and 23 integrally fix the foamed urethane form to reinforcement member 13, and prevent other possible movement of form 12. This eliminates possible clearances that might otherwise result with the incident disadvantages described above with reference to FIGS. 1 and 2.

By the foregoing, there has been disclosed a preferred form of bumper for vehicles constructed in accordance with the present invention. It will be appreciated that various additions, substitutions, modifications and omissions may be made thereto without departing from the spirit of the invention.

What is claimed is:

1. A bumper for vehicles comprising:
   a rim member formed from setting of molten material as a result of a molding operation,
   a foamed urethane form positioned within said rim member to absorb shocks to which the bumper may be subjected, and
   a reinforcement member to reinforce the bumper positioned rearwardly of said foamed urethane form and affixed to said rim member when the latter is formed, said reinforcement member having at least one extended portion which projects into said foamed urethane form and defining apertures through which the molten material is poured to form said rim member, whereby said foamed urethane form and said reinforcement member are integrally fixed to each other upon setting of the molten material.

2. A bumper for vehicles of the type set forth in claim 1 wherein said at least one extended portion comprises a flange-shaped portion.

3. A bumper for vehicles of the type set forth in claim 1 wherein said at least one extended portion comprises a bended portion.

4. A bumper for vehicles of the type set forth in claim 1 wherein said at least one extended portion comprises a spherical portion.

5. A bumper for vehicles of the type set forth in claim 1 wherein said at least one extended portion comprises a T-shaped portion.

6. A bumper for vehicles of the type set forth in claim 1 wherein there is a first T-shaped extended portion and a second spherical shape extended portion.

* * * * *